(No Model.) 2 Sheets—Sheet 1.
G. McKAY.
LASTING MACHINE.
No. 251,452. Patented Dec. 27, 1881.
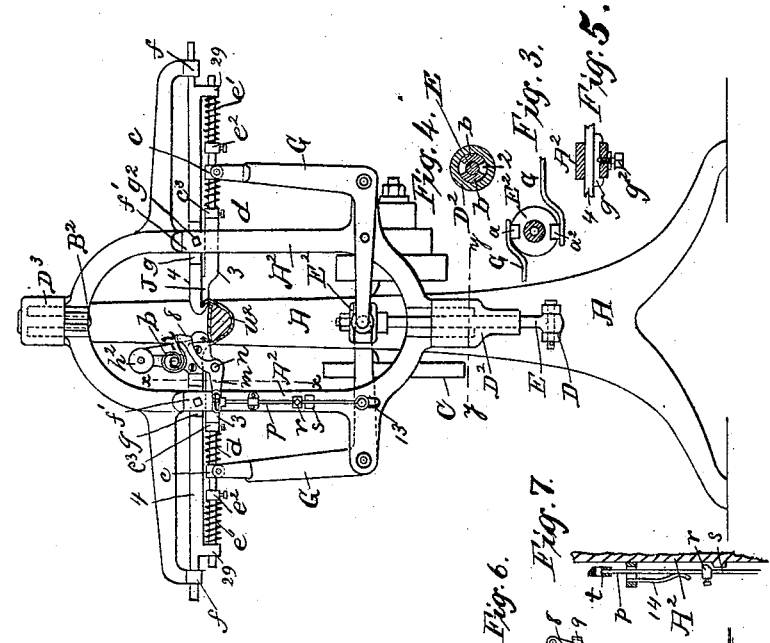
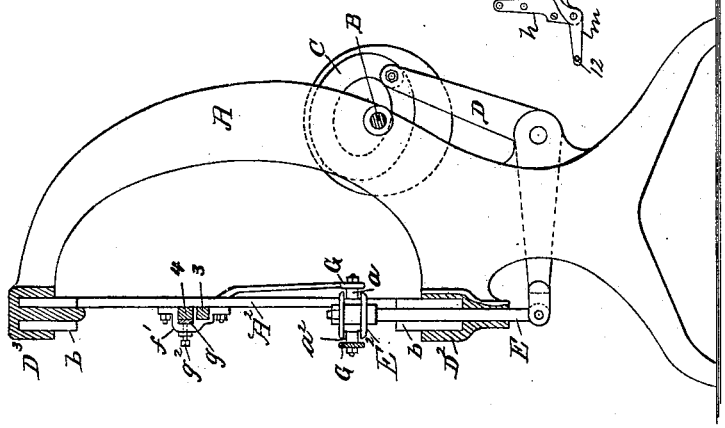
Witnesses.
B. J. Noyes.
John F. C. Preinkert
Inventor:
Gordon McKay
by Crosby & Gregory
Attys (No Model.) 2 Sheets—Sheet 2.
G. McKAY.
LASTING MACHINE.
No. 251,452. Patented Dec. 27, 1881.
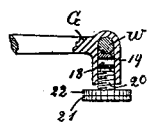
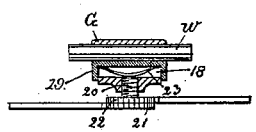
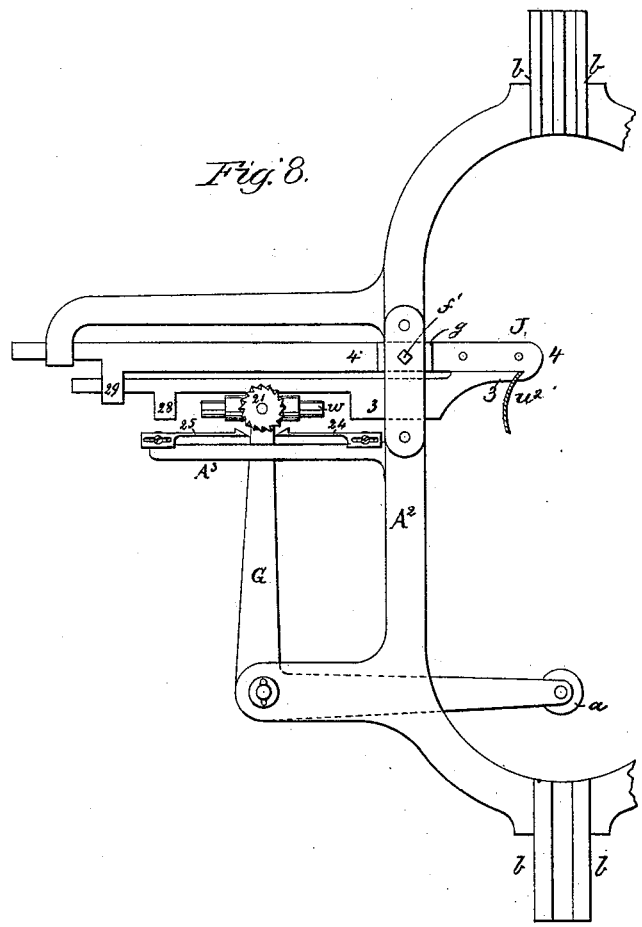
Witnesses
B. J. Noyes.
John F. C. Prinkert
Inventor
Gordon McKay
by Crosby & Gregory
Attys.

UNITED STATES PATENT OFFICE.

GORDON McKAY, OF NEWPORT, RHODE ISLAND.

LASTING-MACHINE.

SPECIFICATION forming part of Letters Patent No. 251,452, dated December 27, 1881.

Application filed November 7, 1881. (No model.)

*To all whom it may concern:*

Be it known that I, GORDON McKAY, of Newport, county of Newport, State of Rhode Island, have invented an Improvement in Lasting-Machines, of which the following description, in connection with the accompanying drawings, is a specification.

This invention in lasting-machines has for its object the production of a power-machine having two sets of clamping-jaws or pinchers adapted to be moved toward and from each other and toward and from a line drawn centrally through the bottom of the last in the direction of its length, the said clamping-jaws or pinchers simultaneously engaging the edges of the upper at opposite sides of the last, and carrying the same over upon the inner sole, where the upper is fastened by tacks or nails.

Jaws at opposite sides of and made movable toward and from the center of the last are not herein broadly claimed. These jaws, although moved automatically and positively, are under the control of springs, or friction devices, which I deem equivalents, so that the jaws are limited in their movement by the stiffness and strength of the upper, the movement of the jaws never being so far outward or inward as to permit the escape of the edges of the upper from between them. In connection with these jaws I have arranged nail, tack, or peg driving devices, and have provided mechanism whereby the nail-driving mechanism, of usual construction, may be automatically operated.

Figure 1 is a front elevation of a sufficient portion of a lasting-machine to illustrate my present invention, the nail or peg driving mechanism being, however, omitted from the jaws at the right of the shoe being lasted. Fig. 2 is a partial vertical section taken through the centers, about which move the side frames which carry the jaws, the latter, however, being cut off on the dotted line $x\ x$, Fig. 1, the devices for operating the nail-driving lever being also omitted. Fig. 3 is a detail showing the grooved collar for actuating the jaw-moving levers at each side of the machine. Fig. 4 is a cross-section on the line $y\ y$, Fig. 1; Fig. 5, a detail of the friction devices for the upper member of the jaw; Fig. 6, a detail showing the bracket, which, connected with the upper member of the jaw, serves to sustain the spool containing string-nails, as well as the other members of an automatic nail-driving mechanism. Fig. 7 is a detail showing the connection between the lever for moving the lower jaw and the lever which carries the nail-driver. Fig. 8 is a modification wherein I have shown friction devices instead of springs; Fig. 9, a partial section through the friction device, Fig. 8; and Fig. 10, a sectional detail of the upper end of the jaw-moving lever of Fig. 8 and the friction device carried by it.

The frame-work A, of suitable shape to sustain the working parts, has a main shaft, B, on which is a cam, C, that engages a suitable pin or roll on a lever, D, the opposite end of which is connected with a rod, E, extended up through a bearing, $D^2$. The rod is provided at its upper end with an annularly-grooved collar, $E^2$, which receives in its groove, at opposite sides of the rod, two pins or rolls, $a\ a^2$, mounted respectively at the ends of the two jaw-moving levers G, each in practice just alike and operating like device. The frame-work has a second bearing, $D^3$, exactly in line with the bearing $D^2$. These bearings receive the curved trunnions $b$ (shown in full lines, Fig. 2, and dotted lines, Fig. 1) of the oscillating side frames, $A^2$, the said trunnions being less than one hundred and eighty degrees in extent, so as to leave a space, 2, between the edges of adjacent trunnions, as in Fig. 4, so that the said side frames may be moved somewhat about the centers of the rod E and pin $B^2$, to enable the jaws carried by the said side frames to change their position, in order that they may be reciprocated in the proper line with relation to the edge of the last, according to its shape, and thus insure the correct drawing of the upper straight on the last.

The levers G, only one of which will be specifically described, because they are both alike, have their fulcrums on the side frame, $A^2$, and at their upper ends are connected with a collar, $c$, loose on the shank of the under member, 3, of the pinchers or jaws J, the said jaws being composed of two members, 3 4, placed one above the other, their front ends being suitably shaped to grasp and hold between them the edges of the upper of the shoe to be lasted, the said shoe, with a last on it, being held preferably by the hands of the operator; but a jack may be used, if desired. The shank of the lower jaw, as shown in Fig. 1, is provided with a spiral spring, $d$, one end of which rests against collar $c$ and the other against an adjustable collar, $c^3$, on the jaw member 3. A second spiral spring, $e'$, on the said shank abuts at one end against the bearing 29, depending from the shank of the upper member, 4, of the pinchers or jaws, the opposite end of the said spring $e'$ resting against a collar, $e^2$, adjustably attached to the shank of jaw member 3. The upper jaw member, 4, is held in bearings $ff'$; but the latter bearing has in it, and in contact with the member 4, a friction-block, $g$, which, acted upon by a screw, $g^2$, may be made to press against the side of the jaw member 4 with more or less force, thus requiring more or less pressure on the springs $e'$ and $d$ to move jaw member 4 with the jaw member 3. The jaw member 3, when started in either direction, will move somewhat before the jaw member 4 will be started in its movement. Hence the acting ends of the jaw members 3 4 will be opened and closed at the proper times and in the proper order to permit the introduction of the edges of the upper between them, then to clamp or pinch the upper and carry it forward over the inner sole, where it will be fastened, and then release their bite on the upper sufficiently to permit the shoe, with the edge of the upper yet between the jaws, to be fed forward preparatory to again closing the said jaw members upon it, to be again moved forward as before. It is manifest that the tension of these springs and the friction exerted by the block $g$ may be adjusted with relation to each other, so that as the lever G acts on spring $d$ it will move inward the jaw member 3 until it meets the upper and clamps it between itself and the member 4 with a force measured by the amount of the friction exerted on the member 4 by the block $g$, after which the two jaw members 3 4 travel inward together and strain and draw the upper over the last, the strain on the upper being at such time measured by the excess of the tension of the spring over the force of the friction exerted by the block and already overcome. Care is taken to keep the tension less than the strength of the leather.

The upper, drawn over on the inner sole, is fastened by tacks or nails, as will be described. The upper having been secured to the inner sole, the lever G is moved in the opposite direction until it meets the collar $e^2$, when the spring $e$ is compressed, forcing back the member 3, withdrawing it from contact with the upper, and as soon as the said spring is so much compressed as to again overcome the friction of the plate $g$ on the member 4 the latter member commences to move backward, and continues to move backward therewith until the resistance offered to the backward movement of the member 4 by the material of the upper, nailed to the inner sole close to the said member, is greater than the tension of the spring $e$, when the said spring is again further compressed, the member 4 remaining at rest until the lever G completes its stroke. The tension of the spring $e$ is never so great as to overcome the resistance offered by the stiffness of the material to the jaw member 4 in its outward movement. Hence the edge of the upper between the said jaw members 3 4 is never permitted to escape from between them, but they are sufficiently separated to permit the edge of the said upper to be moved between the jaw members, to enable them to seize another part of the upper and draw it over to be fastened to the inner sole. Each jaw member 4 will have upon it a standard, $h$, preferably attached to its rearmost side; but for clearness it is herein shown as connected with its front side. This standard is of suitable shape to have connected with it a spool, $h^2$, to contain string-nails, a strong spring, $l$, to act upon the driver-lever $m$, pivoted at $n$, and provided at its upper end with a driver, 8, adapted to engage the heads of the string-nails. This driver drives the nails through the nose 9, (see Fig. 6,) and cuts them off when driven, all substantially as in United States Patent to L. Goddu, No. 216,790, dated February 28, 1879, to which reference may be had, it being deemed unnecessary to herein fully show the said nail-driving apparatus.

Instead of the nailing mechanism such as referred to, I may employ any other suitable and well-known nailing or pegging mechanism.

The driver-lever $m$ is provided at its outer end with a pin, 12, which is engaged by the slotted upper end or head, $t$, of the rod $p$, as the said rod is lifted by the lever G, with which it is connected by a pin, 13, the head of the said rod being beveled to pass above the pin 12, at which time the spring 14 (shown fully in Fig. 7 compressed) forces the rod so that its slotted upper portion or head is made to engage the pin 12. As the rod $p$ descends under the action of lever G the nail-driving lever $m$ is moved to compress the spring $l$; but at the time that the said lever should be operated to drive a nail its pin 12 is released from the head of the rod $p$ through the action of the cam-lug $r$ on the projection $s$ of the side frame, the said lug and projection forcing the rod away from the frame and compressing the spring 14. As soon as released the spring $l$ is free to operate the lever and drive a nail into the upper at the side of the jaw members 3 4. This is done after the jaw members have been moved into their farthest inner position and while the spring $d$ is being compressed by the last part of the movement of the lever G.

Instead of employing the springs $e'$ and $d$, as described, to control the times of movement of the jaw member 3, I may employ friction devices. Referring to the drawings, Figs. 8 to 10, I have shown a variable friction device to perform the functions of the said springs $e'$ $d$.

The upper end of the lever G is provided with a slot, 18, (shown in Fig. 9,) which receives a rod, $w$, forming part of a friction device, the other parts being the end of lever G and a cap, 19, fitted therein to bear against one side of the rod $w$ more or less snugly through the movement of a screw, 20, and ratchet-wheels 21 22 thereon, having reversely placed or inclined teeth, which are acted upon at the proper times to automatically turn the said screw and control the amount of friction or pressure between the rod $w$, the arm G, and cap. A spring, 23, (shown best in Fig. 10,) is placed between the cap 19 and the end of the screw 20.

An arm, $A^3$, projected from the arm $A^2$, has adjustably attached to it two pawls, 24 25, which at proper times during the movement of the lever G in opposite directions act upon the ratchets 21 and 22 and turn them and screw 20 more or less, according to the positions of the said pawls, to thus move the cap 19 more or less and cause it to exert more or less friction on the rod $w$.

The friction device which operates on the member 4 is adjustable, and will be made more or less strong, according to the class of shoe to be lasted; but when once adjusted it will remain in such condition until another kind or class of shoe is to be lasted. The friction on the jaw member 3 will or may be intermitting—that is, it will be least as the jaw member 3 is being moved outward and most when it is being moved forward or toward the center of the last.

To illustrate the operation of this modification of my invention, it will be supposed that an upper is to be lasted, which should be grasped between the jaw members 3 4 and be drawn about the last with a straining force equal to ten pounds. To do this the pawl 25 will be adjusted to turn the screw 20 far enough to produce a friction on the rod $w$, so that it will not be moved longitudinally in the lever G until the right-hand end of the rod $w$, Fig. 8, is pressed against the shoulder of the jaw member 3 with a force in excess of sixteen pounds.

The friction device $g$ for jaw member 4 will be set so that its control of the said jaw member will be lost by a pressure in excess of six pounds. As the lever G under such conditions is moved forward the right-hand end of the rod $w$ strikes the shouldered part of jaw member 3, carries it forward until it meets the outside of the upper, and pinches the latter between it and the jaw member 4; but this jaw member 4 will not move until a pinching pressure in excess of six pounds is produced on the leather of the upper held between the said jaws. The friction of six pounds exerted on jaw member 4 by the friction device $g$ having been overcome, the jaw members 3 4, grasping the upper firmly, as described, and by a measured friction, are moved forward together, and continue to so move together, drawing the upper $w^2$ snugly about the last with the strain determined by the friction on the rod $w$; but should the strain on the upper be in excess of ten pounds—which it will be supposed is substantially all the strain it will bear without tearing—then the friction on the rod $w$ will be overcome, and the forward or inward movement of the jaw members 3 4 will cease. The edge of the upper having been fastened to the inner sole, the jaw members 3 4 must be moved backward or away from the center of the last. At first the jaw member 3 will retire from the upper and jaw member 4, loosening the grasp of the said jaw members on the said upper, and at the same time the pawl 24 will act on the ratchet 22, turn the screw 20, and reduce the pressure of the cap 18 on the rod $w$ to the amount necessary during the backward movement of the jaw members, when, as it has been stated, the strain or pull of the jaw member 4 on the upper engaged by it near the nail or fastening last driven through the upper into the inner sole must not be so great as to detach the upper from the inner sole where last fastened. As the jaw member 3 is moved outward by the lever G the left-hand end of the rod $w$ will first press against the projection 28 of the jaw member 3, moving it outward, retiring from contact with and releasing the upper from pinch between it and jaw member 4, and will continue to move jaw member 3 outward until the projection 28 strikes the projection 29 of jaw member 4, when further movement of lever G and rod $w$ will overcome the friction of the device $g$ on the jaw member 4 and start it moving outward; but the said jaw member 4, if resisted by the upper, must not draw thereon or strain the upper in excess of the amount of strain predetermined for the upper to resist. If this strain was fixed for one pound, more or less, the friction of the cap 18 on the rod $w$ during such backward movement of the lever G should be equal to seven pounds, so that if more than one pound strain be resisted by the upper by reason of the jaw member 4 in engagement with it, the rod $w$ will yield, and the outward movement of the jaws 3 4 will be stopped instantly.

I claim—

1. In a lasting-machine, the movable upper-griping jaw members or devices 3 4 and frictional devices or springs to control the time and order of their movement both with relation to each other and together, whereby the said jaw members are made to automatically grasp and draw the upper over the last under an amount of strain predetermined mechanically, the jaw member 4 being stopped automatically in its outward movement when the strain on the upper secured to the inner sole next the said jaw member is in excess of the strain mechanically predetermined, as described, as the maximum strain to which the upper should be subjected during the outward movement of the said jaw member 4, as and for the purpose set forth.

2. In a lasting-machine, the jaw member 4 and a friction device to retard its motion, combined with the jaw member 3 and suitable spring or friction device to operate it, and subsequently to operate the jaw member 4, to first grasp the upper and then draw it about the last, both with a force automatically predetermined mechanically, as and for the purpose described.

3. The jaw member 4 and a friction device to retard it, combined with the jaw member 3, and a spring or friction device co-operating therewith, to first move the jaw member 3 outward away from the center of the last and afterward take with it the jaw member 4 until arrested by the upper and by a force therein automatically predetermined mechanically, substantially as and for the purpose described.

4. The jaw member 4, friction device to operate upon it, the jaw member 3, and means, substantially as described, to move it, combined with springs or friction devices intermediate the said jaw member 3 and its actuating means, to operate as and for the purpose set forth.

5. The jaw members 3 4 and the automatically-operated nail-driving mechanism, substantially as and for the purpose set forth.

6. The driving-lever $m$, combined with the connecting-rod, to automatically engage and operate and then release the said lever when a nail or fastening is to be driven, and means for actuating the same, substantially as described.

In testimony whereof I have signed my name to this specification in the presence of two subscribing witnesses.

GORDON McKAY.

Witnesses:
HENRY BERNHEIMER,
CHAS. BENNER.